United States Patent [19]

Eck et al.

[11] Patent Number: 5,753,733
[45] Date of Patent: May 19, 1998

[54] REDISPERSIBLE, SILICON-MODIFIED DISPERSION POWDER COMPOSITION, PROCESS FOR ITS PREPARATION AND ITS USE

[75] Inventors: Herbert Eck; Heinrich Hopf; Klaus Adler, all of Burghausen; Franz Jodlbauer, Marktl; Guenter von Au, Burghausen, all of Germany

[73] Assignee: Wacker-Chemie GmbH, Munich, Germany

[21] Appl. No.: 687,507

[22] PCT Filed: Jan. 26, 1995

[86] PCT No.: PCT/EP95/00281

§ 371 Date: Sep. 18, 1996

§ 102(e) Date: Sep. 18, 1996

[87] PCT Pub. No.: WO95/20626

PCT Pub. Date: Aug. 3, 1995

[30] Foreign Application Priority Data

Jan. 27, 1994 [DE] Germany ............ 44 02 408.8

[51] Int. Cl.$^6$ ................................. C08K 3/34
[52] U.S. Cl. .................. 524/265; 524/266; 524/269
[58] Field of Search ............... 524/269, 265, 524/266

[56] References Cited

U.S. PATENT DOCUMENTS

| 3,203,919 | 8/1965 | Brachman et al. | 524/269 |
| 4,704,416 | 11/1987 | Eck et al. | |
| 5,578,668 | 11/1996 | Colombet | 524/265 |

FOREIGN PATENT DOCUMENTS

| 0228657 | 7/1987 | European Pat. Off. |
| 0493168 | 7/1992 | European Pat. Off. |
| 493168 | 7/1992 | European Pat. Off. |
| 0279373 | 4/1993 | European Pat. Off. |

OTHER PUBLICATIONS

English Derwent Abstract AN 92-219270.
Houben-Weyl, Methoden der organischen Chemie, vol. E20, p. 1782 et seq. 2219 et seq., Georg Thieme Verlag, Stuttgart, 1987.
Houben-Weyl, Methoden der organischen Chemie, vol. XIV,1, Makromolekulare Stoffe, pp. 192–208, Georg Thieme Verlag, Stuttgart 1961.

Primary Examiner—Jeffrey T. Smith
Attorney, Agent, or Firm—Burgess, Ryan & Wayne

[57] ABSTRACT

The invention concerns a dispersion powder composition which is redispersible in water and is made from water-insoluble homopolymers or copolymers of preferably ethylenically unsaturated monomers and one or more organosilicon compounds plus, optionally, other additives such as protective colloids and anti-blocking agents. The composition is obtained by: a) polymerizing one or more monomers in the presence of 0.1 to 30% by wt., relative to the total weight of the monomers, of one or more silicon compounds which are dispersible in water and which have a boiling point at normal pressure of >160° C., selected from the group comprising the silanes, polysilanes, oligosiloxanes, polysiloxanes, carbosilanes, polycarbosilanes, carbosiloxanes, polycarbosiloxanes and polysilylenedisiloxanes and: b) spray-drying the product thus obtained, either before or after addition of the additives mentioned.

11 Claims, No Drawings

REDISPERSIBLE, SILICON-MODIFIED DISPERSION POWDER COMPOSITION, PROCESS FOR ITS PREPARATION AND ITS USE

BACKGROUND OF THE INVENTION

1. Field of the Invention

The invention relates to a silicon-modified dispersion powder composition which is redispersible in water and is based on water-insoluble polymers, a process for its preparation and its use.

2. Background Art

Dispersion powder compositions which are redispersible in water and are based on homo- or copolymers of ethylenically unsaturated monomers are known. Such a dispersion powder composition is prepared by spray drying the corresponding aqueous plastics dispersions in a stream of hot air. The dispersion powders are suitable as additives to hydraulic binders in the building materials industry, and such products are furthermore employed as binders in coating compositions or in adhesives.

EP-A 228657 (U.S. Pat. No. 4,704,416) describes dispersion powders which are redispersible in water and are based on water-soluble polymers, and which comprise organic silicon compounds, preferably organopolysiloxanes. The dispersion powders are prepared by spray drying an emulsion of the organic silicon compound in an aqueous solution of the water-soluble polymer.

EP-B 279373 relates to powders which are redispersible in water and comprise organopolysiloxane, and which additionally comprise a water-soluble, film-forming polymer. They are prepared by spray drying the aqueous mixtures of the constituents mentioned.

EP-A 493168 relates to dispersion powders which are redispersible in water and are based on film-forming, water-insoluble vinyl or acrylic polymers, and which comprise silicones, more precisely organosiliconates and/or organopolysiloxanes. They are prepared by spray drying aqueous dispersions of the vinyl or acrylic polymers, to which silicones have been added before the spraying. In this procedure, the silicones are present in emulsion and the water-insoluble polymers in dispersion before the spray drying, so that after the spray drying or the redispersion, products in which the components are present in separate particles are obtained.

The invention was based on the object of providing dispersion powder compositions which are redispersible in water and are based on water-insoluble polymers, and which are modified with organosilicon compounds in a manner such that the two components are present together in the powder particles and in the redispersed particles, and if appropriate are bonded to one another via chemical bonds.

SUMMARY OF THE INVENTION

The invention relates to a dispersion powder composition which is redispersible in water and is based on water-insoluble homo- or copolymers of preferably ethylenically unsaturated monomers and one or more organosilicon compounds and, if appropriate, further additives, such as protective colloids and antiblocking agents, obtainable by a) polymerization of one or more monomers in the presence of 0.1 to 30% by weight, based on the total weight of the monomers, of one or more organosilicon compounds which are dispersible in water and have a boiling point under normal pressure of >160° C., from the group consisting of silanes, polysilanes, oligosiloxanes, polysiloxanes, carbosilanes, polycarbosilanes, carbosiloxanes, polycarbosiloxanes and polysilylenedisiloxanes and b) spray drying of the product thus obtained, if appropriate before or after addition of the additives mentioned.

DESCRIPTION OF THE PREFERRED EMBODIMENTS

Preferred water-insoluble polymers are:

vinyl ester homo- or copolymers containing one or more monomer units from the group consisting of vinyl esters of unbranched or branched alkylcarboxylic acids having 1 to 15 C atoms;

(meth)acrylic acid ester homo- or copolymers containing one or more monomer units from the group consisting of methacrylic acid esters and acrylic acid esters of unbranched or branched alcohols having 1 to 12 C atoms;

homo- or copolymers of fumaric and/or maleic acid mono- or diesters of unbranched or branched alcohols having 1 to 12 C atoms;

homo- or copolymers of dienes, such as butadiene or isoprene, and of olefins, such as ethene or propene, it being possible for the dienes to be copolymerized, for example with styrene, (methacrylic acid esters or the esters of fumaric of maleic acid;

homo- or copolymers of vinyl aromatics, such as styrene, methylstyrene or vinyltoluene;

homo- or copolymers of vinyl halogen compounds, such as vinyl chloride.

Where appropriate, water-insoluble, film-forming polyaddition and polycondensation polymers, such as polyurethanes polyesters, polyethers, polyamides, epoxy resins, melamine-formaldehyde resins or phenol-formaldehyde resins, which are accessible by polymerization of the corresponding monomers or oligomeric compounds, are also suitable.

Preferred vinyl esters are vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having up to 10 C atoms, for example VeoVa9$^R$ or VeoVa10$^R$. Vinyl acetate is particularly preferred.

Preferred methacrylic acid esters or acrylic acid esters are methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate, 2-ethylhexyl acrylate. Methyl acrylate, methyl methacrylate, n-butyl acrylate and 2-ethylhexyl acrylate are particularly preferred.

Preferred ester groups of fumaric and maleic acid are the methyl, ethyl, n-propyl, isopropyl, n-butyl, isobutyl, t-butyl, hexyl, ethylhexyl and dodecyl group.

If appropriate, the vinyl ester copolymers can comprise 1.0 to 65% by weight, based on the total weight of the comonomer phase, of α-olefins, such as ethylene or propylene, and/or vinyl aromatics, such as styrene, and/or vinyl halides, such as vinyl chloride, and/or acrylic acid eaters or methacrylic acid esters of alcohols having 1 to 10 C atoms, such as methyl acrylate, methyl methacrylate, ethyl acrylate, ethyl methacrylate, propyl acrylate, propyl methacrylate, n-butyl acrylate, t-butyl acrylate, n-butyl methacrylate, t-butyl methacrylate and 2-ethylhexyl acrylate and/or ethylenically unsaturated dicarboxylic acid esters or derivatives thereof, such as diisopropyl fumarate, the dimethyl, methyl t-butyl, di-n-butyl, di-t-butyl and diethyl esters of maleic acid or fumaric acid, or maleic anhydride.

If appropriate, the (meth)acrylic acid ester copolymers can comprise 1.0 to 65% by weight, based on the total weight of the comonomer phase, of α-olefins, such as ethylene or propylene, and/or vinyl aromatics, such as styrene, and/or vinyl halides, such as vinyl chloride, and/or ethylenically unsaturated dicarboxylic acid esters or derivatives thereof, such as diisopropyl fumarate, the dimethyl, methyl butyl, dibutyl and diethyl esters of maleic acid or fumaric acid, or maleic anhydride.

In a preferred embodiment, the vinyl ester copolymers and the (meth)acrylic acid ester copolymers also comprise 0.05 to 10.0% by weight, based on the total weight of the comonomer mixture, of auxiliary monomers from the group consisting of ethylenically unsaturated carboxylic acids, preferably acrylic acid or methacrylic acid; from the group consisting of ethylenically unsaturated carboxylic acid amides, preferably acrylamide; from the group consisting of ethylenically unsaturated sulphonic acids and salts thereof, preferably vinylsulphonic acids; and/or from the group consisting of polyethylenically unsaturated comonomers, for example divinyl adipate, diallyl maleate, allyl methacrylate or triallyl cyanurate. Suitable auxiliary monomers are also comonomers having a crosslinking action, for example acrylamidoglycolic acid (AGA), methylacrylamidoglycolic acid methyl ester (MAGME), N-methylolacrylamide (NMAA), N-methylolmethacrylamide, allyl N-methylolcarbamate and alkyl ethers, such as the isobutoxy ether, or esters of N-methylolacrylamide, of N-methylolmethacrylamide or Corresponding statements to those for the (meth)acrylic acid ester copolymers apply to the copolymers of esters of maleic or fumaric acid.

In the most preferred embodiment, the ethylenically unsaturated monomers are copolymerized with 0.02 to 5.0% by weight, preferably 0.05 to 2.0% by weight, based on the total weight of the monomers, of ethylenically unsaturated silicon compounds which contain at least one hydrolysable group bonded to a silicon atom or at least one Si—OH group. Suitable ethylenically unsaturated silicon compounds can be summarized by the general formula $R^1—SiR^3_a(OR^2)_{3-a}$, where $a=0$ to 2, wherein R is identical or different and denotes branched or unbranched alkyl radicals having 1 to 22 C atoms, cycloalkyl radicals having 3 to 10 C atoms, alkylene radicals having 2 to 4 C atoms or aryl, aralkyl or alkylaryl radicals having 6 to 18 C atoms, where the radicals R mentioned can also be substituted by halogens, such as F or Cl, by ether, thioether, ester, amide, nitrile, hydroxyl, amine, epoxide, carboxyl, carboxylic acid anhydride and carbonyl groups. $R^1$ is an ethylenically unsaturated organic radical and $R^2$ denotes identical or different radicals from the group consisting of hydrogen, $C_1-C_6$-alkyl or alkoxyalkylene radical. The boiling point of these compounds is insignificant. If appropriate, these compounds can also be water-soluble.

Preferred silicon-containing monomers are compounds of the general formulae:.

$CH_2=CH—(CH_2)_{0-8}—SiR^3_a(OR^4)_{3-a}$, $CH_2=CR^5—CO_2—(CH_2)_b—SiR^3_a(OR^4)_{3-a}$,

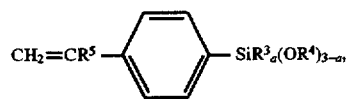

$HS(CH_2)_b—SiR^3_a(OR^4)_{3-a}$,

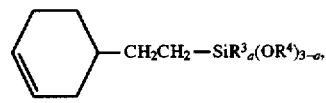

where
$a=0-2$,
$b=1-6$, $R^3=CH_3$, $C_6H_5$, $R^4=H$, $CH_3$, $C_2H_5$, $C_3H_7$, $C_6H_5$, $(CH_2)_{2-3}—O—(CH_2)_{1-2}H$ and $R_5=H$, $CH_3$.

Particularly preferred silicon-containing mono

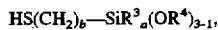

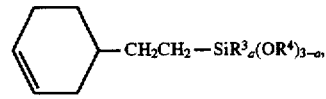

where
$a=0-2$,
$b=1-6$, $R^3=CH_3$, $C_6H_5$, $R^4=H$, $CH_3$, $C_2H_5$, $C_3H_7$, $C_6H_5$, $(CH_2)_{2-3}—O—(CH_2)_{1-2}H$ and $R^5=H$, $CH_3$.

Particularly preferred silicon-containing monomers are γ-acryl- or γ-methacryloxypropyltri(alkoxy)-silanes and vinyltrialkoxysilanes, alkoxy groups which can be employed being, for example, methoxy, ethoxy, methoxyethylene, ethoxyethylene, methoxypropylene glycol ether or ethoxypropylene glycol ether radicals. Vinyltrimethoxy- and vinyltriethoxysilane and γ-methacryloxypropyltriethoxysilane are most preferred.

Preferred non-copolymerizable organosilicon compounds which are dispersible in water and have a boiling point >160° C. (under normal pressure) from the group consisting of silanes, polysilanes, oligosiloxanes, polysiloxanes, carbosilanes, polycarbosilanes, carbosiloxanes, polycarbosiloxanes and polysilylenedisiloxanes are:

silicic acid esters $Si(OR')_4$, organoorganoxysilanes $SiR_n(OR')_{4-n}$, where $n=1$ to 3, organosilanols $SiR_n(OH)_{4-n}$, where $n=1$ to 3, polysilanes of the general formula $R_3Si(SiR_2)_nSiR_3$ where $n=0$ to 500, preferably 0 to 8, and di-, oligo- and polysiloxanes of units of the general formula $R_cH_dSi(OR')_e(OH)_fO_{(4-c-d-e-f)/2}$ where $c=0$ to 3, $d=0$ to 1, $e=0$ to 3, $f=0$ to 3 and the sum $c+d+e+f$ per unit is not more than 3.5, wherein R' represents identical or different alkyl radicals or alkoxyalkylene radicals having 1 to 4 C atoms, preferably denotes methyl or ethyl, and R is identical or different and denotes branched or unbranched alkyl radicals having 1 to 22 C atoms, cycloalkyl radicals having 3 to 10 C atoms, alkylene radicals having 2 to 4 C atoms, aryl, aralkyl or alkylaryl radicals having 6 to 18 C atoms, where the radicals R mentioned can also be substituted by halogens, such as F or Cl, by ether, thioether, ester, amide, nitrile, hydroxyl, amine, carboxyl, sulphonic acid, carboxylic acid anhydride and carbonyl groups, where, in triethoxysilane, dipropyldiethoxysilane, methylphenyldiethoxysilane, diphenyldimethoxysilane, triphenylsilanol and preferably liquid condensation products thereof, if appropriate with other low-boiling and/or water-soluble silanes, such as methyltrimethoxysilane, γ-aminopropyltriethoxysilane or other silanes containing amino functions, such as $H_2NCH_2CH_2NHCH_2CH_2CH_2Si(OCH_3)_3$,

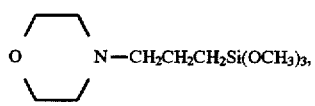

silanes containing quaternary ammonium salt groups, such as $C_{18}H_{37}N^{\oplus}(CH_3)_2$—$CH_2CH_2CH_2Si(OCH_3)_3Cl^{\ominus}$, silanes containing epoxide groups, such as

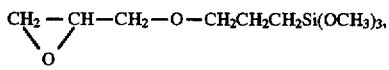

and silanes containing carboxylic acid and carboxylic acid anhydride functional groups, such as

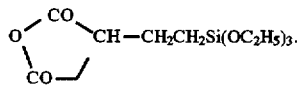

Compounds which may furthermore be mentioned are: the disilanes dimethyltetraalkoxydisilane, tetramethyldialkoxydisilane and trimethyltrialkoxydisilane, or (co) condensates thereof which are in general obtainable from the corresponding chlorine compounds. Methylhydridopolysiloxanes terminally blocked by trimethylsiloxy groups, copolymers, terminally blocked by trimethylsiloxy groups, of dimethylsiloxane and methylhydridosiloxane units, and dimethylpolysiloxanes containing in each case one Si-bonded hydroxyl group in the terminal units are also particularly preferred. There may also be mentioned organosilicon compounds, which are soluble in the monomers, from the group consisting of alkyl and phenyl resins and the resins and oils which contain epoxide or amine, propyl or higher alkyl groups.

Preparation of the organosilicon compounds can be carried out by processes such as are described in Noll, Chemie und Technologie der Silicone [Chemistry and technology of the silicones], 2nd edition 1968, Weinheim and in Houben-Weyl, Methoden der organischen Chemie [Methods of organic chemistry], Volume E20, page 1782 et seq., 2219 et seq., Georg Thieme Verlag, Stuttgart, 1987.

The polymerization is preferably carried out by the emulsion polymerization process, but can also be carried out by means of the block or the solution polymerization process. Water-sensitive monomers, such as amine, propyl or higher alkyl groups.

Preparation of the organosilicon compounds can be carried out by processes such as are described in Noll, Chemie und Technologie der Silicone [Chemistry and technology of the silicones], 2nd edition 1968, Weinheim and in Houben-Weyle Methoden der organischen Chemie [Methods of organic chemistry], Volume E20, page 1782 et seq., 2219 et seq., Georg Thieme Verlag, Stuttgart,, 1987.

The polymerization is preferably carried out by the emulsion polymerization process, but can also be carried out by means of the block or the solution polymerization process. Water-sensitive monomers, such as ketene acetals, which can be polymerized by free radicals can also be polymerized by the last two processes mentioned. Addition and polycondensation polymers are furthermore accessible by these processes. In these cases, the compositions of polymer and organosilicon, compound(s) dissolved in organic, water-insoluble solvents are emulsified with the aid of the water-soluble, film-forming protective colloids, mentioned below, and if appropriate emulsifiers, and the emulsions are spray dried, if appropriate after addition of further additives.

The emulsion polymerization process, which is mentioned as preferred, is carried out in an open reaction vessel or in pressure vessels, preferably in a temperature range from 0° to 100° C., and is initiated by the methods usually employed for emulsion polymerization. The initiation is carried out by means of the customary, at least partly water-soluble agents which form free radicals, which are preferably employed in amounts of 0.01 to 3.0% by weight, based on the total weight of the monomers. Examples of these agents are ammonium and potassium persulphate and peroxodisulphate; hydrogen peroxide and t-butyl peroxide; alkyl hydroperoxides, such as tert-butyl hydroperoxide; potassium, sodium and ammonium peroxodiphosphate; and azo compounds, such as azobisisobutyronitrile or azobiscyanovaleric acid. If appropriate, the free radical initiators mentioned can also be combined in a known manner with 0.01 to 1.0% by weight, based on the total weight of the monomers, of reducing agents. Suitable reducing agents are, for example, alkali metal formaldehyde-sulphoxylates and ascorbic acid. In the case of redox initiation, one or both redox catalyst components are preferably metered in here during the polymerization.

Dispersing agents which can be employed are all the emulsifiers and/or protective colloids usually used in emulsion polymerization. Both anionic and cationic as well as nonionic emulsifiers are suitable emulsifiers. Those which are not soluble in the protective colloid and have molecular weights, in contrast to the protective colloid, of below 2000 are preferred. The emulsifiers are is employed in an amount of 0 to 6% by weight, based on the total weight of the monomers. Suitable emulsifiers are familiar to the expert and are to be found, for example, in Houben-Weyl, Methoden der organischen Chemie [Methods of organic chemistry], Volume XIV, 1, Makromalekulare Stoffe [Macromolecular substances], Georg Thieme Verlag, Stuttgart, 1961, 192–208.

The protective colloids are preferably employed in amounts of up to 15% by weight, based on the total weight of the monomers. Examples of these are vinyl alcohol/vinyl acetate copolymers having a content of 80 to 100 mol % of vinyl alcohol units; polyvinylpyrrolidones having a molecular weight of 5000 to 400,000; hydroxyethylcelluloses having a degree of substitution range from 1.5 to 3; polysaccharides in water-soluble form, such as starches (amylose and amylopectin), cellulose, guar, tragacanthic acid, dextran, alginates and carboxymethyl, methyl, hydroxyethyl and hydroxypropyl derivatives thereof; proteins, such as casein, soya protein and gelatine a synthetic polymers, such as poly(meth)acrylic acid, poly(meth)acrylamide, polyvinylsulphonic acids and water-soluble copolymers thereof; and melamine-formaldehydesulphonates, naphthaleneformaldehydesulphonates, and styrene/maleic acid and vinyl ether/maleic acid copolymers. In a particularly preferred embodiment, the polymerization is carried out with a protective colloid without addition of an emulsifier.

The pH range desired for the polymerization, which is in general between 2.5 and 10, preferably 3 and 8, can be established in a known manner by acids, bases or customary buffer salts, such as alkali metal phosphates or alkali metal carbonates. To establish the molecular weight, the regulators usually used, for example mercaptans, aldehydes and chlorinated hydrocarbons, can be added during the polymerization.

Regardless of the polymerization process chosen, the polymerization can be carried out discontinuously or continuously, with or without the use of seed latices, with initial introduction of all the constituents or individual constituents of the reaction mixture, or with initial introduction of a portion of the constituents or of individual constituents of the reaction mixture and subsequent metering of the constituents or individual constituents of the reaction mixture, or by the metering method without an initial charge.

The organosilicon compound, which is dispersible in water, is preferably metered in, individually or as a mixture, only in the course of the polymerization. Metering is particularly preferably carried out after a conversion of 50 to 98%, most preferably 80 to 95%. The metering can be carried out in solution in one or more organic monomers, or separately in the pure form, or as an emulsion. Preferably, 0.5 to 20%, based on the total weight of the monomer phase, of organosilicon compounds is added.

In the most preferred embodiment, the ethylenically unsaturated silicon-containing monomers already mentioned are additionally copolymerized with the organic monomers. These monomers, in the pure form, in solution, for example in the organic monomers, or as an emulsion, if appropriate with the organic monomers, can be initially introduced or metered in during the polymerization. They are preferably added after more than 50%, particularly preferably more than 80%, of the ethylenically unsaturated organic copolymers are polymerized.

The solids content of the dispersions thus obtainable is 20 to 60%.

In the case of preparation of silicon-modified redispersible powders of polyurethanes, polyesters, polyamides, melamine-formaldehyde resins and phenolformaldehyde and epoxy resins, these products are prepared by the polymerization processes customary therefor in the presence of the organosilicon compound(s), preferably in an organic solvent. In a preferred embodiment, organosilicon compounds which contain functional groups, such as the epoxide, amino or carbonyl group, which can react with the organopolymers are employed here. The compositions, dissolved in organic water-insoluble solvents, of polymer and organosilicon compound(s) are emulsified with the water-soluble film-forming protective colloids mentioned below and, if appropriate, with emulsifiers before the spray drying.

By the procedure according to the invention, copolymerization of Si-containing monomers gives a dispersion of particles in which the organopolymer is at least partly bonded to the organosilicon compound via C—Si—O—Si bonds, in the form of graft copolymers. If polymerization is carried out without Si-containing monomers, the organosilicon compound and the organopolymer are often in the form of interpenetrated networks (IPN) or semiinterpenetrated networks or as a mixture in the same dispersion particles. The wide range of variation of the internal structure of the redispersion powder particles which is thus possible allows optimization for the particular field of use without great technical expenditure by means of minor changes to the preparation process and the recipe.

Drying of the dispersion for preparation of the dispersion powder composition is carried out by means of spray drying in customary spray drying units, it being possible for the atomization to be effected by means of single-, dual- or multicomponent nozzles or with a rotating disc. The discharge temperature is in general chosen in the range from 55° C. to 100° C., preferably 70° to 90° C., depending on the unit, the Tg of the resin and the desired degree of drying.

If appropriate, a mixture of the dispersion prepared according to the invention having a solids content of preferably 20 to 60% and of other additives can be sprayed and dried together during the spray drying.

In a preferred embodiment, the dispersion powder composition comprises 8 to 50% by weight, preferably 10 to 25% by weight, of protective colloid, based on the total amount of water-insoluble polymer and organosilicon compound, at least some of the amount of protective colloid in the finished dispersion or the solution of the composition of polymer and organosilicon compound being added before the spray drying, preferably in the form of an aqueous solution. Suitable protective colloids are, for example, polyvinyl alcohols and derivatives thereof; polysaccharides in water-soluble form, such as starches (amylose and amylopectin), cellulose, guar, tragacanthic acid, dextran, alginates and carboxymethyl, methyl, hydroxyethyl and hydroxypropyl derivatives thereof; proteins, such as casein, soya protein and gelatine; synthetic polymers, such as poly(meth)acrylic acid, poly(meth)acrylamide, polyvinylsulphonic acids and water-soluble copolymers thereof; and melamine-formaldehydesulphonates, naphthalene-formaldehydesulphonates, and styrene/maleic acid and vinyl ether/maleic acid copolymers.

Where appropriate, other constituents of the dispersion powder composition are emulsifiers which are not soluble in the protective colloids employed, and antiblocking agents, such as Ca carbonate or Mg carbonate, talc, gypsum, silicic acid and silicates having particle sizes preferably in the range from 10 nm to 10 μm.

The dispersion powder composition can be employed in the typical fields of use. For example, in chemical building products in combination with inorganic, hydraulically setting binders, such as cements (Portland, aluminate, trass, Hüllen, magnesia or phosphate cement), gypsum or waterglass, for the preparation of building adhesives, plasters, stopper compositions, flooring stopper compositions, joint mortars and paints. Furthermore as sole binders for coating compositions and adhesives or as binders for textiles.

The dispersion powder composition is preferably employed as a hydrophobizing binder in fields of use where, in addition to good adhesion, a reduced uptake of water and/or a water-repellent effect is also desired. As can also be seen from the results of the use test, a very low water uptake results when the dispersion powder composition according to the invention is used, for example, in plasters, without the other mechanical properties being influenced in an adverse manner.

EXAMPLES

Preparation of the dispersion powder compositions:

Example 1:

A solution of 6400 g of vinyl acetate, 320 g of isooctyltriethoxysilane and 7 g of methaeryloxypropyltriethoxysilane was emulsified into a solution of 524 g of a polyvinyl alcohol having a Höppler viscosity of 4 mpas (in a 4% strength solution at 20° C.) and a hydrolysis number of 140 in 4890 g of water in an 18 l autoclave. 1480 g of ethylene were forced in and polymerization was carried out at 50° C. with the redox catalyst system of 26 g of potassium persulphate (3% strength aqueous solution) and 13 g of Br üggolit (Na formaldehyde-sulphoxylate; 1.5% strength aqueous solution in the course of 4 hours. A dispersion having a solids content of 57% resulted.

After the autoclave had been let down, 5 parts, calculated on 100 parts of dispersion, of a polyvinyl alcohol having a Höppler viscosity of 25 mPas (in a 4% strength solution at 20° C.) and a hydrolysis number of 140 were stirred into the dispersion and the solids content of the dispersion was then adjusted to 33% with water. The dispersion was sprayed in a Nebulosa spray drier under the following conditions;
intake temperature: about 112° C., discharge temperature; 80° C.,
compressed air pressure upstream of 2-component nozzle: 4 bar,
throughput: 12 l/hour.

After the spraying, 10% by weight, based on the spray-dried product, of a commercially available antiblocking agent (mixture of Ca/MgCO$_3$ and Mg hydrosilicate) was incorporated. The dry powder was very readily free-flowing and redispersible in water.

Example 2:

The procedure was analogous to Example 1, with the difference that vinyltriethoxysilane was copolymerized instead of methacryloxypropyltriethoxysilane. The dry powder thus obtained was very readily free-flowing and redispersible in water.

Example 3:

Example 1 was repeated but instead of isooctyltriethoxysilane, 4% by weight, based on the amount of comonomer, of an isooctyltrimethoxysilane initially condensed with 1.5 mol of water per 2 mol of silane was used. The powder thus obtained was very readily free-flowing and redispersible in water.

Example 4:

Example 2 was repeated, but the copolymerizable and the non-copolymerizable silane were not dissolved in the initial mixture in vinyl acetate, but added to the initial mixture in a mixture as an emulsion. The powder thus obtained was very readily free-flowing and redispersible in water.

Example 5:

Example 2 was modified to the extent that the silane mixture was dissolved in 10% of the vinyl acetate and this solution was metered in only as the polymerization started to subside (90% conversion). The powder thus obtained was very readily free-flowing and redispersible in water.

Example 6:

The procedure was analogous to Example 3, with the difference that no methacryloxypropyltriethoxysilane was copolymerized. The powder thus obtained was very readily free-flowing and redispersible in water.

Example 7:

A mixture of 568 g of n-butyl acrylate in 568 g of styrene was emulsified into a solution of 320 g of polyvinyl alcohol (Höppler viscosity 4 mPas in a 4% strength solution at 20° C., hydrolysis number=140) and 290 g of a polyvinyl alcohol containing carbonyl groups (LL 620, product of Wacker-Chemie) in 7140 g of water in an 18 l reactor and the emulsion was heated to 80° C. While keeping the temperature constant, the polymerization was initiated by addition of t-butyl peroxide (5% strength aqueous solution) and Na formaldehydesulphoxylate (8% strength aqueous solution). The total consumption was, overall, 44 g of t-butyl hydroperoxide and 70 g of Na formaldehyde-sulphoxylate. 5 minutes after the internal temperature started to rise, a mixture of 3220 g of n-butyl acrylate and 3220 g of styrene was metered in over a period of 4 hours. After 3.5 hours had passed, 325 g of isooctyltriethoxysilane and 7 g of methacryloxypropyltriethoxysilane were metered in with the remaining n-butyl acrylate/styrene mixture. After the end of the metering, polymerization was carried out at 80° C. for one hour and after-polymerization was finally carried out at 45° C. for 3 hours. In each case 2.5% by weight, based on the total weight of the dispersion, of a polyvinyl alcohol having a Höppler viscosity of 25 mPas in 4% strength aqueous solution at 20° C. and a hydrolysis number of 140 and of a polyvinyl alcohol having a Höppler viscosity of 13 mPas in 4% strength aqueous solution at 20° C. and a hydrolysis number of 140 were added to the dispersion thus obtained and the dispersion was diluted with water to a solids content of 33%. Spraying was carried out analogously to Example 1. The powder thus obtained was very readily redispersible and free-flowing.

Example 8:

The procedure was analogous to Example 7, with the difference that instead of methacryloxypropyltriethoxysilane, the same amount of vinyltriethoxysilane was used and was metered in together with the isooctyltriethoxysilane from the start, with the n-butyl acrylate/styrene mixture. The powder thus obtained was very readily free-flowing and redispersible in water.

Comparison Example 1:

The procedure was analogous to Example 1, but the polymerization was carried out without the addition of isooctyltriethoxysilane and without copolymerization of methacryloxypropyltriethoxysilane. A powder which was very readily free-flowing and redispersible in water was obtained.

Comparison Example 2:

The procedure was analogous to Example 7, but the polymerization was carried out without the addition of isooctyltriethoxysilane and without copolymerization of methacryloxypropyltriethoxysilane. A powder which was very readily free-flowing and redispersible in water was obtained.

Use test:

The products prepared in the Examples and the Comparison Examples were employed in the following rolling plaster or joint filler recipe:

Rolling plaster recipe:
452.0 parts of Inducarb 500 (CaCO$_3$, 0.03–0.5 mm)
200.0 parts of Inducarb 0000 (CaCO$_3$, 0.4–0.9 mm)
150.0 parts of white cement PZ 45 F
80.0 parts of hydrated lime 2741
40.0 parts of Kronos 2056 (TiO$_2$ pigment)
15.0 parts of Arbocel BC 1000 (cellulose fibre)
2.0 parts of Culminal MC 3000 PR (cellulose ether)
1.0 part of Amylotex 8100 (starch ether)
60.0 parts of dispersion powder composition water requirement per 1000 g of dry mixture: about 350 ml
Joint filler recipe:
300.0 parts of Portland cement PZ 35 F
40.0 parts of aluminate cement
649.5 parts of quartz sand (0.1–0.4 mm)
0.5 part of Culminal C 8556 (cellulose ether)
10.0 parts of dispersion powder composition water requirement per 1000 g of dry mixture: 200 ml
Testing the joint filler recipe:

The compressive strength of plasters prepared with these recipes was tested in accordance with DIN 1164. The water uptake was determined in accordance with DIN 52617 after storage of the recipe in the dry state for 14 days at 23° C./50% relative atmospheric humidity. The processability was evaluated qualitatively. The results of the testing are summarized in Table 1.

Testing the rolling plaster recipe:

The adhesive tensile strength of plasters prepared with these recipes was tested in accordance with DIN 1164. Using method A, the measurement was made after storage in the dry state for 28 days at 23° C./50% relative atmospheric humidity. Using method B, the measurement was made after storage in the dry state for 7 days at 23° C./50% relative atmospheric humidity and storage under water for a further 21 days at 23° C. The flexural tensile strength and compressive strength were determined in accordance with the above-mentioned standard after storage in the dry state for 28 days at 23° C./50% relative atmospheric humidity.

The water uptake coefficient was determined in accordance with DIN 52617 after storage of the recipe in the dry state for 14 days at 23° C./50% relative atmospheric humidity.

The results of testing are summarized in Table 2.

TABLE 1

(Testing of the joint filler receipe)

| Example | Example 6 | Comparison Example 1 |
|---|---|---|
| Water uptake (kg/m² × h⁰·⁵) | 0.197 ± 0.005 | 0.759 ± 0.020 |
| Compressive strength (N/mm²) | 16.0 ± 0.3 | 17.4 ± 0.5 |
| Processability | somewhat tacky | somewhat tacky |

TABLE 2

(Testing of the rolling plaster recipe)

| Example | Example 1 | Example 2 | Example 3 | Example 4 | Example 5 | Comp. Ex. 1 |
|---|---|---|---|---|---|---|
| Adhesive strength | | | | | | |
| Method A (N/mm²) | 0.783 ± 0.049 | 0.755 ± 0.113 | 0.806 ± 0.014 | 0.795 ± 0.093 | 1.020 ± 0.080 | 0.679 ± 0.33 |
| Method B (N/mm²) | 0.765 ± 0.072 | 0.778 ± 0.053 | 0.640 ± 0.036 | 0.803 ± 9.120 | 0.926 ± 0.032 | 0.694 ± 0.029 |
| Flexural tensile strength (N/mm²) | 2.61 ± 0.03 | 2.21 ± 0.06 | 2.39 ± 0.06 | 2.31 ± 0.10 | 2.80 ± 0.14 | 2.22 ± 0.06 |
| Compressive strength (N/mm²) | 3.08 ± 0.18 | 2.55 ± 0.14 | 3.03 ± 0.17 | 2.53 ± 0.21 | 3.58 ± 0.04 | 2.54 ± 0.11 |
| Water uptake (kg/m² × h⁰·⁵) | 0.164 ± 0.043 | 0.071 ± 0.019 | 0.077 ± 0.016 | 0.079 ± 0.017 | 0.082 ± 0.011 | 0.351 ± 0.065 |

We claim:

1. A dispersible powder composition which is redispersible in water and is comprising water-insoluble polymers of ethylenically unsaturated monomers and, one or more organosilicon compounds and, optionally additives, said composition being prepared by
   a) polymerization of one or more monomers in the presence of 0.1 to 30% by weight, based on the total weight of the monomers, of one or more non-copolymerizable organosilicon compounds which are dispersible in water and have a boiling point under normal pressure of >160° C., selected from the group consisting of silanes, polysilanes, oligosiloxanes, polysiloxanes, carbosilanes, polycarbosilanes, carbosiloxanes, polycarbosiloxanes and polysilylenedisiloxanes and
   b) spray drying the emulsion thus obtained, before or after addition of any additives.

2. The dispersible powder composition according to claim 1, which is obtainable by emulsion polymerization of one or more monomers selected from the group consisting of vinyl esters of unbranched or branched alkylcarboxylic acids having 1 to 15 C atoms; of methacrylic acid esters and acrylic acid esters of unbranched or branched alcohols having 1 to 12 C atoms; of fumaric and/or maleic acid mono- or diesters of unbranched or branched alcohols having 1 to 12 C atoms; of dienes, and of olefins, it being possible for the dienes to be copolymerized, of vinyl aromatics, and of vinyl halogen compounds.

3. Dispersible powder composition according to claim 1 which is obtainable by copolymerization of the ethylenically unsaturated monomers with 0.02 to 5.0% by weight, based on the total weight of the monomers, of ethylenically unsaturated silicon compounds with the general formula $R^1$—$SiR_a(OR^2)_{3-a}$, where a=0 to 2, wherein R is identical or different and denotes branched or unbranched alkyl radicals having 1 to 22 C atoms, cycloalkyl radicals having 3 to 10 C atoms, or aryl, aralkyl or alkylaryl radicals having 6 to 18 C atoms, where the radicals R mentioned can also be substituted by halogens, such as F or Cl, by ether, thioether, ester, amide, nitrile, hydroxyl, amine, epoxide, carboxyl, carboxylic acid anhydride and carbonyl groups, $R^1$ is an ethylenically unsaturated organic radical and $R^2$ denotes identical or different radicals from the group consisting of hydrogen, $C_1$–$C_6$-alkyl or alkoxyalkylene radical.

4. Dispersible powder composition according to claim 3, wherein one or more compounds of the general formulae $CH_2$=$CH$—$(CH_2)_{0-8}$—$SiR^3_a(OR^4)_{3-a}$, $CH_2$=$CR^5$—$CO_2$—$(CH_2)_b$—$SiR^3_a(OR^4)_{3-a}$,

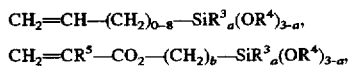

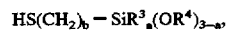

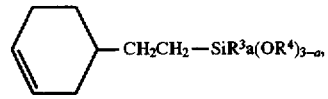

where a=0–2, b=1–6, $R^3$=$CH_3$, $C_6H_5$, $R^4$=H, $CH_3$, $C_2H_5$, $C_3H_7$, $C_6H_5$, $(CH_2)2$-3—O—$(CH_2)_{1-2}$H and $R^5$=H, $CH_3$, are copolymerized as the ethylenically unsaturated silicon compounds.

5. Dispersible powder composition according to claim 1, wherein the emulsion polymerization is carried out in the presence of one of more organo-silicon compounds which are dispersible in water, and have a boiling point >160° C. under normal pressure and are selected from the group consisting of silicic acid esters $Si(OR')_4$, organoorganoxysilanes $SiR_n(OR')_{4-n}$, where $n=1$ to 3, organosilanols $SiR_n(OH)_{4-n}$, where $n=1$ to 3, polysilanes of the general formula $R_3Si(SiR_2)_nSiR_3$ where $n=0$ to 500, and di-, oligo- and polysiloxanes of units of the general formula $R_cH_dSi(OR')_e(OH)_fO_{(4-c-d-e-f)/2}$ where $c=0$ to 3, $d=0$ to 1, $e=0$ to 3, $f=0$ to 3 and the sum $c+d+e+f$ per unit is not more than 3.5, wherein R' represents identical or different alkyl radicals or alkoxyalkylene radicals having 1 to 4 C atoms, and R is identical or different and denotes branched or unbranched alkyl radicals having 1 to 22 C atoms, cycloalkyl radicals having 3 to 10 C atoms, aryl, aralkyl or alkylaryl radicals having 6 to 18 C atoms, where the radicals R mentioned can also be substituted by halogens, such as F or Cl, by ether, thioether, ester, amide, nitrile, hydroxyl, amine, carboxyl, sulphonic acid, carboxylic acid anhydride and carbonyl groups, where, in the case of the polysilanes, R can also have the meaning OR'.

6. Process for the preparation of dispersible powder compositions according to claim 1 by means of a) emulsion polymerization in an open reaction vessel or in pressure vessels, in a temperature range from 0° to 100° C., initiated with the at least partly water-soluble agents which form free radicals and which are usually employed for emulsion polymerization, emulsifiers and/or protective colloids being employed as dispersing agents, and the polymerization being carried out discontinuously or continuously, with or without the use of seed latices, with initial introduction of all the constituents or individual constituents of the reaction mixture, or with initial introduction of a portion of the constituents or of individual constituents of the reaction mixture and subsequent metering of the constituents or individual constituents of the reaction mixture, or by the metering method without an initial charge and b) optionally adding a protective colloid before or after the spray drying.

7. Process according to claim 6, wherein the non-copolymerizable organosilicon compound which is dispersible in water, individually or as a mixture, is initially introduced or is metered in only in the course of the polymerization, the metering being carried out in solution in one or more organic monomers, or separately in the pure form, or as an emulsion.

8. Process according to claim 6 wherein the ethylenically unsaturated silicon-containing monomers are initially introduced or are metered in only in the course of the polymerization, the metering being carried out in solution, in the pure form or as an emulsion.

9. The dispersible powder composition of claim 1 wherein the additives are protective colloids or antiblocking agents.

10. The dispersible powder composition of claim 2 wherein the dienes are butadiene or isoprene; the olefins are ethene or propane, the dienes can be copolymerized with styrene, (meth)acrylic acid esters or the esters of fumaric or maleic acid; the vinyl aromatics are styrene, methylstyrene or vinyltoluene, and the vinyl halogen compound is vinyl chloride.

11. The dispersible powder composition of claim 5 wherein R' represents methyl or ethyl.

* * * * *